Figure 1:
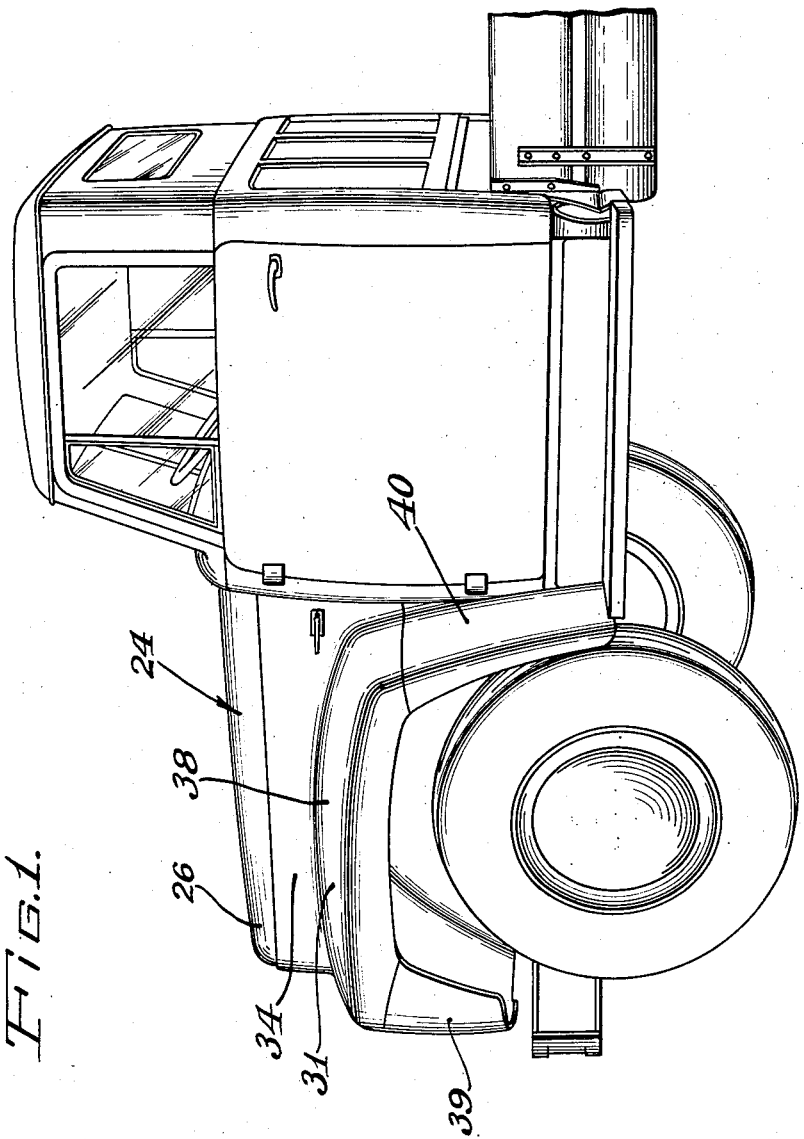

May 6, 1958   F. A. LEE   2,833,364
MOTOR VEHICLE ENGINE ENCLOSURE CONSTRUCTION
Filed Aug. 13, 1954   2 Sheets-Sheet 1

Inventor:
Fred A. Lee
Paul O. Pippel
Atty.

May 6, 1958          F. A. LEE          2,833,364

MOTOR VEHICLE ENGINE ENCLOSURE CONSTRUCTION

Filed Aug. 13, 1954          2 Sheets-Sheet 2

Inventor:
Fred A. Lee
Paul O. Pippel
Atty.

2,833,364

MOTOR VEHICLE ENGINE ENCLOSURE CONSTRUCTION

Fred A. Lee, Fort Wayne, Ind., assignor to International Harvester Company, a corporation of New Jersey Application August 13, 1954, Serial No. 449,740

1 Claim. (Cl. 180—69)

This invention relates to a motor vehicle body construction and more particularly to a new and improved sectional body structure for enclosing the engine, engine accessories and the ground-engaging wheels adjacent to the engine.

The present-day trend in motor vehicle design and construction is toward the development of vehicle bodies having a width considerably greater than those previously manufactured. Increasing the width of the vehicle body has rendered accessibility to the engine and accessories for minor adjustments or major repairs difficult since it is necessary for the mechanic to bridge the vehicle fenders adjacent the engine with his body in order to work on the engine. Obviously many of the engine parts cannot be conveniently reached when the mechanic is lying on a relatively wide fender. This is especially true in the case of the motor trucks where comparatively high fenders are employed. The fenders are considered an immovable part of the body structure and entirely independent of the hood panel or covering for the engine enclosure which is movable to gain access to the engine. It is, therefore, the primary objective of the present invention to provide a vehicle body front end structure which will allow ready access to the engine and accessories contained in the engine enclosure as well as provide wheel covers for ground-engaging wheels spaced laterally of the engine without the need of departing from present-day styling practices.

To accomplish the above mentioned objective the engine enclosure and wheel housings or fenders adjacent each side of the engine enclosure are formed of a plurality of sections or walls. Certain panels or sections of the engine enclosure and wheel housings are stationary as in conventional motor vehicles while others which normally engage the stationary sections to form the engine enclosure and wheel housings are movable to positions therein the engine is substantially exposed and the wheels adjacent the engine are uncovered whereby the mechanic can assume a comfortable position between the wheel and the engine when working on the engine.

A further object is the provision of a sectional engine enclosure including a stationary rear wall and forward wall, a vertically swingable top panel bridging the rear and forward walls, and horizontally swingable side walls.

A still further object is the provision of a swingable member which serves as a wheel housing and includes a vertical section which is normally disposed in a substantially parallel relationship with a vertical plane containing the longitudinal axis of the vehicle to thus separate or isolate the wheels from the engine but is capable of being swung away from the engine to gain access to the side of the engine.

Another object is the provision of a pair of members each having an axis of rotation which is substantially vertically disposed and which members normally are positioned and include sections or panels which serve as the side walls for the engine enclosure and as wheel housings for the adjacent wheels.

Still another object is the provision of an engine enclosure and housings for the ground-engaging wheels adjacent the engine which are constructed of certain elements which are relatively fixed to the chassis frame and other elements which are movable between a closed position wherein they inter-fit and coact with the fixed parts of elements to form enclosure for the engine and housings or fenders for the adjacent wheels and a second or open position wherein the sides and the top of the engine are exposed for repair and adjustment and the ground-engaging wheels are completely uncovered.

Figure 2:
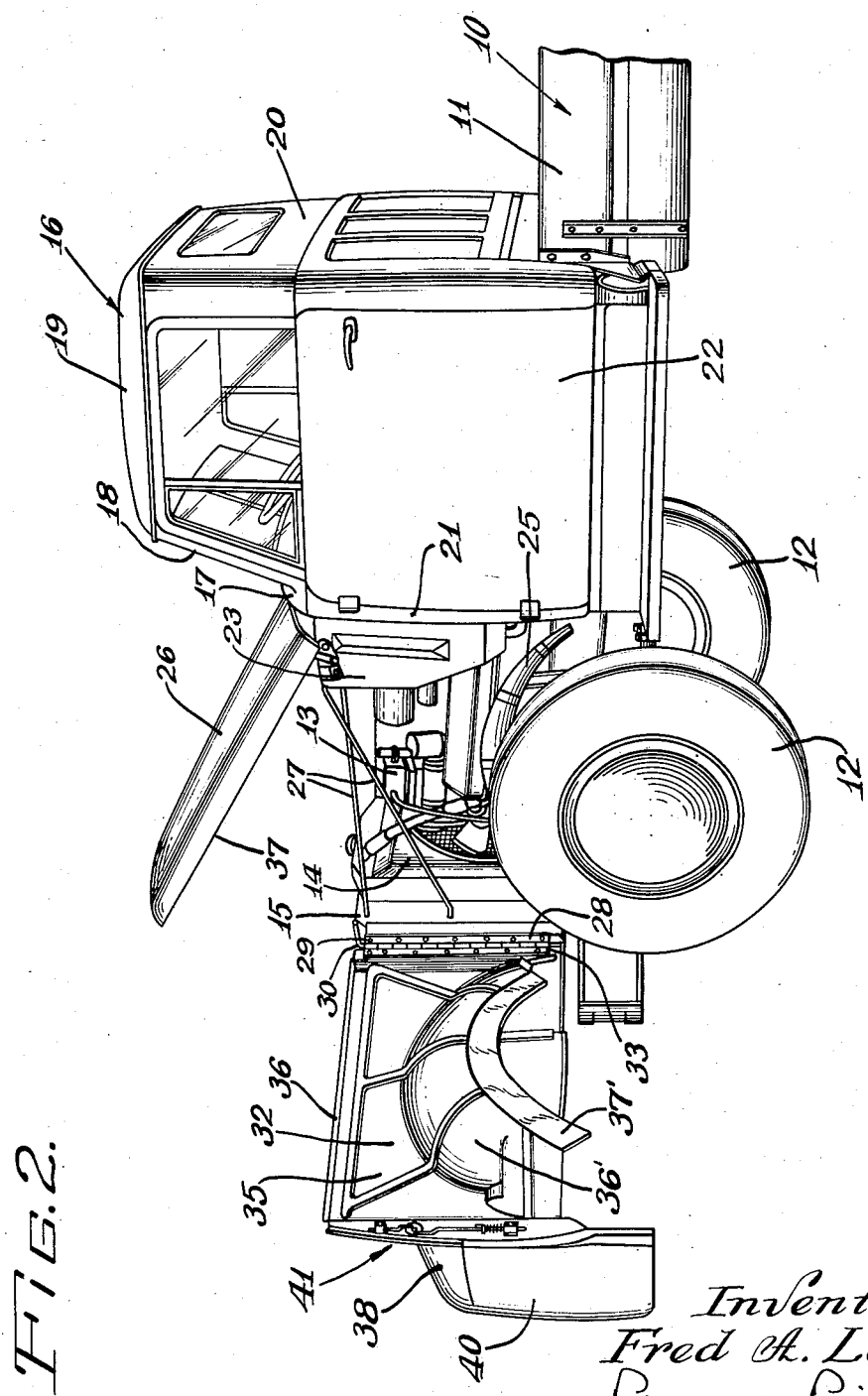

The foregoing and other important objects and desirable features inherent in and encompassed by the invention, together with many of the purposes and uses thereof, will become readily apparent from a reading of the ensuing description in conjunction with the annexed drawings, in which:

Figure 1 is a side elevational view of a motor truck embodying the invention; and Figure 2 is a view similar to Figure 1 with the exception that the top panel of the engine enclosure is in its raised position and the wheel housing and engine enclosure side wall components are swung outwardly away from the normal in-swung position assumed thereby.

Referring to the drawings in detail, wherein like reference characters designate like elements throughout the various views, there is shown a portion of a motor truck chassis frame 10 which includes longitudinally extending sill members 11. A pair of steerable ground-engaging wheels 12 are resiliently suspended from the chassis frame 10 in a conventional manner.

A vehicle power plant 13 is mounted on the extreme forward end of the chassis frame 10. The engine or power plant 13 is shown somewhat diagrammatically since it forms no part of the present invention per se. The engine cooling liquid is circulated through an upright radiator core 14 supported on the chassis frame 10 and spaced forwardly of the engine 13 and is encircled by a vertical, transversely extending grille panel 15 which is also supported by the chassis frame 10.

An operator's compartment, designated generally by numeral 16, is supported by the chassis frame 10 rearwardly of the engine 13 and includes a cowl panel 17 having a windshield frame 18 integrally formed therewith. A roof 19 has a forward edge rigidly secured to the windshield frame 18 and has a rearward edge connected in a like manner to a back panel 20. Depending vertically from the transversely spaced ends of the cowl panel 17 are hinged pillar posts 21 which pivotally support the side doors 22. An inverted U-shaped cowl bar 23 is secured to the cowl panel 17. Suitably secured to the cowl bar 23 is a dash panel or fire wall (not shown) which is disposed between the engine 13 and the interior of the operator's compartment 16. The dash panel and the cowl bar 23 serve as a rear wall of an engine enclosure, designated generally by numeral 24, and the grille panel 15 defines the forward wall or limit of the engine enclosure.

An upright panel 25 is secured to each sill member 11 adjacent the side of the engine 13. As best shown in Figure 2 the upper marginal edge of each splash panel 25 is curved and has a radius of curvature less than the radii of the ground-engaging wheels 12.

The engine enclosure 24 includes a top cover member 26, illustrated in its normally closed position in Figure 1, and which is adapted to be swung on a transverse horizontal axis by means of suitable hinge supports to an opened or raised position as shown in Figure 2 for affording access to the top of engine 13. In the lowered position illustrated in Figure 1, the rear portion of the member 26 overlaps the cowl bar 23 and the forward portion rests upon resilient supports, not shown, carried by the uppermost edge of radiator grille 15 and to which it is adapted to be detachably secured by suitable latching mechanism, not shown. Suitable struts 27 extending between and attached to the dash panel and the grille panel 15 are provided for rigidifying the upright grille panel 15.

A piano-type hinge leaf 29, disposed vertically, is fastened to each vertical side edge of the grille panel 15 by means of securing bolts 29. A pintle 30 having its upper end bent at right angles to the axis of the pintle is adapted to extend through the hinge leaf 28 and be supported thereby.

Extending between the grille panel 15 and the pillar posts 21 are a pair of removable sheet metal members 31, one of which is shown in Figures 1 and 2. It is to be understood that a similar member 31 is positioned at the opposite side of the engine 13. Each member 31 includes a generally vertically disposed wall 32 which is in substantially longitudinal alignment with a respective side marginal edge of the grille panel 15 and a pillar post 21 when in its in-swung or closed position as shown in Figure 1. The forwardmost marginal edge of the wall 32 is provided with a hinge leaf 33 which is complementary to a hinge leaf 28 and is adapted to be rotatably supported on a pintle 30. Wall 32 of each member 31 includes an outer panel 34 and a ribbed inner panel 35. The uppermost marginal surfaces 36 of the walls 32 are horizontally disposed and are adapted to be engaged by the side marginal edges 37 of the top cover 26 when the top cover is in its lowered position and the members 31 are in their closed positions. Weather stripping (not shown) is suitably secured to the surfaces 36 for sealing the juncture between the top cover 26 and the walls 32. It will be noted that a substantially vertical plane passing through the side marginal edge of the grille panel 15 and a respective post 21 is laterally spaced between a wheel 11 and a chassis frame side sill member 11 and since the splash panel 25 is secured to the side of each channel member 11 each splash panel 25 is spaced inwardly laterally from such vertical plane. The splash panels 25 form the stationary section of the side walls of the engine enclosure 24 and the inner panels 35 serve as the movable parts of the engine enclosure side walls. The lower portion 36' of each inner panel 35 is disposed inwardly when in the position shown in Figure 1 and is somewhat toroidal in shape so that the innermost edge of the portion 36' is in substantially vertical alignment with a respective splash panel 25 when the movable members 31 are in their in-swung or closed positions. The innermost edge of the portion 36' is arcuate in shape and has a radius of curvature somewhat greater than the radius of the wheel 12 so that the movable members 31 will clear the wheels when swung horizontally between their normal in-swung positions and their out-swung or open positions, as shown in Figure 2. Inasmuch as the upper marginal edge of each splash panel 25 has a radius of curvature less than the radius of the wheel 12 and the inner marginal edge of each portion 36' has a radius of curvature greater than the wheel 12 the inner edges of the portions 36' are vertically spaced above the uppermost edges of respective splash panels 25 when the members 31 are in their in-swung position. A strip 37' of flexible material such as rubber or the like is suitably secured to and depends from the innermost edge of each portion 36' and is adapted to bear against a respective splash panel 25 when in its closed position as shown in Figure 1. Thus the strips 37' flex and permit the members 31 to clear the wheels 12 when moved between their in-swung and out-swung positions and serve to bridge the gap between the inner edge of the portions 36' and the upper edges of the splash panels 25 when the members are in their in-swung positions to completely isolate the interior of the engine compartment 24 from the ground-engaging wheels 12.

It will be apparent from the foregoing that the engine 13, radiator core 14 and other engine accessories are completely enclosed within the engine enclosure 24 when the members 31 are in their closed or in-swung positions and the cover member 26 is in its lowered position. Consequently, dirt, water and other foreign elements thrown by the wheels 12 during operation of the motor truck are prevented from entering the enclosure 24 and being deposited on the engine and accessories.

The swingable members 31 not only serve as movable side wall portions of the engine enclosure 24, but also as housings or fenders for the ground-engaging wheels 12. Each member 31 is formed with a horizontal portion 38 which extends transversely from the plane of the outer panel and is disposed directly over a respective wheel 12 to thereby cover the same when in its normal in-swung position as shown in Figure 1. Depending from the end portions of the horizontal portions 38 are front plates 39 and rear plates 40 which are secured to the horizontal portions 38 by any suitable means. Horizontal portion 38, front plate 39, and rear plate 40 of each member 34 have an outer contour similar to that of conventional fenders. A releasable locking device, designated generally by numeral 41, is provided for connecting each movable member 31 to a respective door pillar post 21.

The embodiment of the invention chosen for the purposes of illustration and description herein is that preferred for achieving the object of the invention and developing the utility thereof in the most desirable manner, due regard being had to existing factors of economy, simplicity of design and construction and the improvements sought to be effected. It will be appreciated, therefore, that the particular structural and functional aspects emphasized herein are not intended to exclude but rather to suggest such other adaptations and modifications of the invention as fall within the spirit and scope of the invention as defined in the appended claim.

What is claimed is:

In a motor vehicle having an engine supported by a chassis frame, a ground-engaging wheel adjacent said engine supporting said chassis frame, an operator's compartment mounted on said chassis frame rearwardly of said engine having a substantially vertical door pillar post, a transversely extending generally vertical radiator grille secured to said chassis frame forwardly of said engine, and a generally vertically disposed, longitudinally extending splash panel positioned between said engine and a ground-engaging wheel, the uppermost edges of said splash panel being vertically spaced below the top of said wheel and a substantially vertical plane passing through said pillar post and a side edge of said radiator grille being laterally spaced between said splash panel and said wheel; a member including a top wall of a wheel fender pivotally connected to the side edge of said radiator grille whereby said member is capable of swinging horizontally about a substantially vertical axis to and from a normal, overlying relationship with said ground-engaging wheel, said member including a vertical wall normally extending substantially between said pillar post and said radiator grille, and a curved wall portion extending inwardly and downwardly from said vertical wall, the lowermost edge of said curved wall portion being radially spaced outwardly from the outer periphery of said wheel and being normally in vertical alignment with said plash panel; and flexible means depending from said curved wall portion adapted to bridge the gap between said curved wall portion and splash panel and engage the uppermost marginal edge of said splash panel when said member is in its normal position to provide a partition between said wheel and engine.

(References on following page)

References Cited in the file of this patent

UNITED STATES PATENTS

| | | |
|---|---|---|
| 1,964,114 | Gerlach et al. | June 26, 1934 |
| 2,199,036 | Best | Apr. 30, 1940 |
| 2,209,727 | Gibson | July 30, 1940 |
| 2,413,792 | Sharp | Jan. 7, 1947 |
| 2,447,898 | Colaner | Aug. 24, 1948 |
| 2,474,852 | Lyon | July 5, 1949 |
| 2,606,625 | Paton | Aug. 12, 1952 |
| 2,699,223 | Brumbaugh | Jan. 11, 1955 |

OTHER REFERENCES

Peterbilt Truck Pamphlet, received in U. S. Patent Office July 20, 1953, pages 2 and 4.